United States Patent [19]
Ang

[11] Patent Number: 6,037,833
[45] Date of Patent: Mar. 14, 2000

[54] GENERATOR FOR GENERATING VOLTAGE PROPORTIONAL TO ABSOLUTE TEMPERATURE

[75] Inventor: Mike Anthony Ang, Santa Clara, Calif.

[73] Assignee: Philips Electronics North America Corporation, New York, N.Y.

[21] Appl. No.: 08/966,725

[22] Filed: Nov. 10, 1997

[51] Int. Cl.[7] .................................................. G05F 1/10
[52] U.S. Cl. ........................... 327/543; 327/541; 323/313
[58] Field of Search .................................. 327/530, 538, 327/539, 540, 541, 543; 323/315, 316

[56] References Cited

U.S. PATENT DOCUMENTS 5,061,862  10/1991  Tamagawa ........................... 307/296.1
5,629,611   5/1997  McIntyre ................................. 323/313
5,774,013   6/1998  Groe ....................................... 327/543
5,781,043   7/1998  Slemmer ................................. 327/78
5,818,212  10/1998  Min et al. .............................. 323/314

OTHER PUBLICATIONS

"Analysis and Design of Analog Integrated Circuits", by Paul R. Gray et al, Second Edition, pp. 293–296.

*Primary Examiner*—Terry D. Cunningham
*Attorney, Agent, or Firm*—Steven S. Rubin

[57] ABSTRACT

A circuit includes a generator that supplies a signal that is directly proportional to the absolute temperature. No calibration or external reference components are necessary.

2 Claims, 1 Drawing Sheet

GENERATOR FOR GENERATING VOLTAGE PROPORTIONAL TO ABSOLUTE TEMPERATURE

BACKGROUND OF THE INVENTION

The present invention relates to an electronic circuit integrated in a semiconductor substrate, providing a voltage signal that is proportional to absolute temperature. Power dissipated during operational use of an electronic circuit reveals itself as heat. The heat generated by an integrated circuit typically increases with increasing transistor density and with increasing clock frequency. Temperature dependent voltage generators are known, such as described in "Analysis and Design of Analog Integrated Circuits" Second Edition by Paul R. Gray and Robert G. Meyers, ©1984 on pages 293–296. Such generators can be used as on-chip temperature sensors for use in, e.g. a cooling system.

SUMMARY OF THE PRESENT INVENTION

A voltage generator circuit is provided to generate a voltage proportional to absolute temperature of the substrate. The circuit needs no calibration or external reference components.

BRIEF DESCRIPTION OF THE DRAWINGS

The invention is explained in further detail and by way of example in FIG. 1.

DESCRIPTION OF PREFERRED EMBODIMENTS

Figure 1:
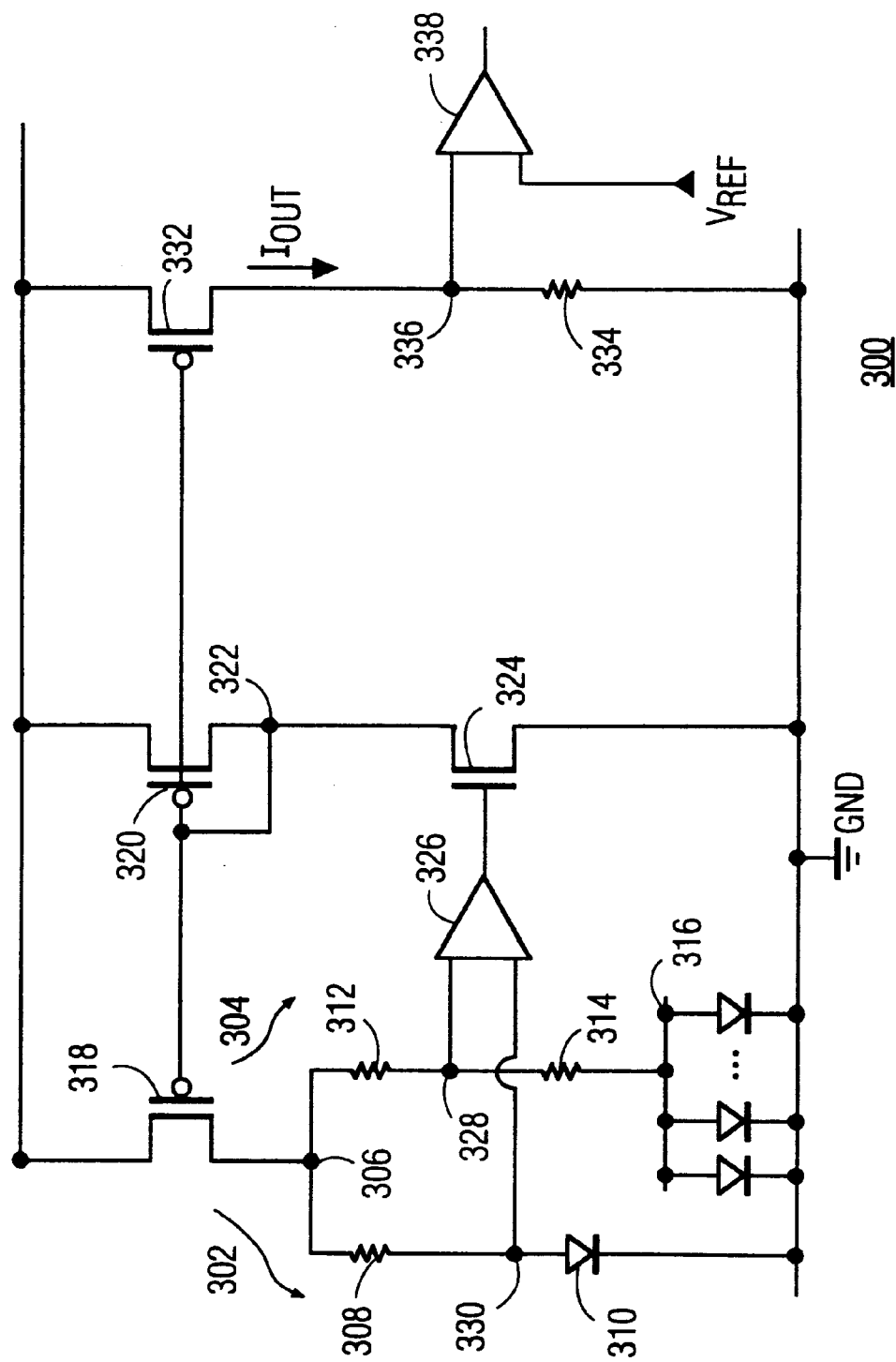
FIG. 1 is a diagram of a voltage generator circuit according to the present invention.

In FIG. 1, a diagram of a voltage generator circuit 300 for an integrated circuit on a substrate, of the present invention is shown. The voltage generator circuit 300 supplies an output voltage proportional to the substrate's absolute temperature and is largely process-independent.

Two current branches 302 and 304 of voltage generator circuit 300 are parallel between a node 306 and ground (GND). Branch 302 includes a series arrangement of a resistor 308 and a diode 310. Branch 304 includes a series arrangement of a resistor 312, a resistor 314, and a parallel arrangement 316 of a number of N diodes. In the present invention, N=20. A node 306 is an output of a current mirror with FETs 318 and 320. A node 322 forms an input of current mirror 318/320. The node 322 is connected to a current source 324. A first input of amplifier 326 is connected to a node 328 between the resistors 312 and 314. A second input of amplifier 326 is connected to a node 330 between resistor 308 and diode 310. An output of amplifier 326 is connected to a control input of source 324. In the present example, the resistors 308 and 312 have identical values. The configuration of the voltage generator circuit 300 forms a negative feedback loop to control currents through branches 302 and 304 as follows.

The current in branch 302 ($I_{302}$) is represented by:

$$I_{302}=I_0 exp(qV_{be310}/kT)=I_0 exp(qV_{330}/kT) \qquad (1).$$

where:
$I_0$ is a constant dependent on geometry and dopant profile;
$V_{be310}$ is the junction voltage of diode 310;
q is the elementary charge;
k is Boltzmann's constant;
T is the absolute temperature of the substrate in Kelvin; and
$V_{330}$ is the voltage at node 330.

The current in branch 304 ($I_{304}$) is represented by:

$$NI_{316}=NI_0 exp(qV_{be316}/kT) \qquad (2).$$

where:
$V_{be316}$ is the voltage drop across a single diode in parallel arrangement 316 of N diodes; and
$I_{316}$ is the current through a single diode in arrangement 316.

The negative feedback loop controls the currents such that the voltage at node 330 equals the voltage at node 328:

$$V_{330}=V_{be316}+NI_{316}R \qquad (3).$$

where R is the resistance of resistor 314.
Equation 3 translates to:

$$(kT/q)log(I_{302}/I_0)=(kT/q)log(I_{304}/I_0)+NI_{304}R \qquad (4).$$

which is equivalent to:

$$(kT/q)log(I_{302}/I_{304})=NI_{304}R \qquad (5).$$

The condition that the voltage at node 330 equals the voltage at node 328 also translates into:

$$I_{302}R_{308}=NI_{316}R_{312} \qquad (6).$$

where:
$R_{308}$ is the resistance of resistor 308; and
$R_{312}$ is the resistance of resistor 312.
Since $R_{308}=R_{312}$, in the present example, $$I_{302}=NI_{316} \qquad (7).$$

Combining equations (7) and (5) gives:

$$(kT/q)logN=NI_{316}R=I_{302}R \qquad (8).$$

or written differently:

$$I_{302}=NI_{304}=\{(kT/q)logN\}/R \qquad (9).$$

This formula (9) implies that the aggregate current at output 306 of mirror 318/320 is proportional to the absolute temperature T and inversely proportional to resistance R. Mirroring out this current through additional mirror output 332 provides a current source that supplies a current $I_{out}$ proportional to the absolute temperature T and inversely proportional to resistance R. This current $I_{out}$ is made to flow through another resistor 334 with resistance R' made in the same IC process as resistor 314. A node 336 between mirror output 332 and resistor 334 thus has a voltage proportional to the absolute temperature since the temperature dependencies of the resistors 314 and 334 cancel. Comparing this voltage with a reference voltage $V_{ref}$ preferably externally adjustable, in a differential amplifier 338 creates a control voltage.

Since thermostat circuit 300 provides a signal voltage that is proportional to the absolute temperature, no calibration such as laser-trimming or external components is needed.

As can now be readily appreciated, the invention generates a signal that is proportional to the absolute temperature thereby eliminating a need for calibration. The invention may be included in any of the subsystems of a larger entity or may be a separate system. One skilled in the art may easily modify various aspects of the present invention.

It will thus be seen that the objects set forth above among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not limiting sense.

It is also to be understood that the following claims are intended to cover all of the generic and specific features of the invention herein described and all statements of the scope of the invention which, as a matter of language, might be said to fall therebetween.

What is claimed is:

1. A integrated circuit comprising a device for generating a voltage proportional to the absolute temperature of the integrated circuit, comprising:

a current mirror having a mirror input, a first mirror output and a second mirror output;

first and second current branches connected in parallel with one another and disposed in series with the first mirror output, the first current branch comprising a first series arrangement of a first resistor and a first diode; and the second current branch comprising a second series arrangement of a second and third resistor in series with a parallel arrangement of multiple further diodes;

an operational amplifier having a first amplifier input connected between the first resistor and the first diode and a second amplifier input connected between the second and third resistors, said operational amplifier having an amplifier output; and a controllable current source connected to the mirror input and having a control input connected to the amplifier output;

wherein said second mirror output yields a current which, when passed through a known resistance, produces said voltage.

2. A method for generating a voltage proportional to absolute temperature, comprising the steps of:

supplying a current to a mirror input of a current mirror, said current mirror having a first mirror output and a second mirror output;

supplying a first mirror output current from the first mirror output to first and second current branches connected in parallel with one another and disposed in series with the first mirror output, the first current branch comprising a first series arrangement of a first resistor and a first diode; and the second current branch comprising a second series arrangement of a second and third resistor in series with a parallel arrangement of multiple further diodes;

supplying a first current to a first amplifier input of an operational amplifier, said first amplifier input connected between the first resistor and the first diode;

supplying a second current to a second amplifier input of the operational amplifier, said second amplifier input connected between the second and third resistors;

outputting an amplifier output from an amplifier output of the operational amplifier;

supplying the amplifier output to a control input of a controllable current source, said controllable current source being connected to the mirror input; and supplying a second mirror output current from the second mirror output to a third branch comprising a fourth resistor wherein said voltage is generated across said fourth resistor.

* * * * *